United States Patent
Zhong et al.

(10) Patent No.: US 10,927,896 B2
(45) Date of Patent: Feb. 23, 2021

(54) MOTOR ASSEMBLY AND METHOD OF ASSEMBLING MOTOR

(71) Applicant: Schaeffler Tehnologies AG & Co. KG, Herzogenaurach (DE)

(72) Inventors: Guihui Zhong, Charlotte, NC (US); Zakariya Ayesh, Charlotte, NC (US); Edward J. Wey, Waxhaw, NC (US); Marion Jack Ince, Mount Holly, NC (US); Charles Schwab, Fort Mill, SC (US); John Tate, Cornelius, NC (US)

(73) Assignee: Schaeffler Tehnologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/511,553

(22) Filed: Jul. 15, 2019

(65) Prior Publication Data
US 2021/0018040 A1    Jan. 21, 2021

(51) Int. Cl.
*F16C 41/00*    (2006.01)
*G01D 11/24*    (2006.01)

(52) U.S. Cl.
CPC ............ *F16C 41/00* (2013.01); *G01D 11/245* (2013.01); *F16C 2226/62* (2013.01); *F16C 2233/00* (2013.01); *F16C 2380/26* (2013.01)

(58) Field of Classification Search
CPC ......... F16C 19/52; F16C 41/00; F16C 41/007
See application file for complete search history.

(56) References Cited

U.S. PATENT DOCUMENTS

| | | | |
|---|---|---|---|
| 5,428,290 A | 6/1995 | Porcher | |
| 6,494,622 B2 * | 12/2002 | Plesh, Sr. | B65G 39/20 384/542 |
| 6,540,405 B2 * | 4/2003 | Kobayashi | F16C 19/166 384/450 |
| 6,859,002 B2 * | 2/2005 | Desbiolles | B62D 5/046 318/400.39 |
| 7,307,415 B2 | 12/2007 | Seger et al. | |
| 7,772,836 B2 * | 8/2010 | Isobe | G01D 5/2451 324/207.25 |
| 8,371,758 B2 * | 2/2013 | Muramatsu | F16C 33/32 384/492 |
| 8,616,775 B2 * | 12/2013 | Watanabe | F16C 19/362 384/448 |
| 9,329,022 B2 | 5/2016 | Kegeler et al. | |
| 10,012,267 B2 | 7/2018 | Kegeler | |
| 2015/0300412 A1 | 10/2015 | Kegeler | |
| 2017/0227111 A1 * | 8/2017 | Matsuda | G01L 3/105 |

FOREIGN PATENT DOCUMENTS

EP           1580533 A2    9/2005
JP     2002242242947   *   8/2002

* cited by examiner

*Primary Examiner* — James Pilkington
(74) *Attorney, Agent, or Firm* — Antun M. Peakovic

(57) ABSTRACT

In a motor assembly, a rotor and a trigger wheel are each secured to a first race of a four-point contact ball bearing. The circumferential position of the rotor and trigger wheel are each fixed with respect to the first bearing, and therefore with respect to one another. A resolver sensor is bolted to a housing. A second race is mounted at a fixed axial position relative to the housing, thereby locating the trigger wheel with respect to the resolver sensor. In some embodiments, the first race may be an inner race and the second race an outer race. In other embodiments, the first race may be an outer race and the second race an inner race.

20 Claims, 6 Drawing Sheets

MOTOR ASSEMBLY AND METHOD OF ASSEMBLING MOTOR

TECHNICAL FIELD

The present disclosure concerns a method of mounting a rotor of an electric motor and a trigger wheel with respect to a resolver sensor. In particular, the trigger wheel and rotor are each secured to one of the races of a four-point ball bearing as opposed to being secured directly to one another.

BACKGROUND

Fuel efficiency requirements demand that automobiles be more efficient or even be electrified. More hybrid and electric vehicles are coming into the market. This leads to more motor control in the vehicle. Variable Reluctance (VR) resolver angular position sensors permit sensing the absolute rotor angular position with robustness, high reliability, simple construction, high temperature capability, high resolution, high contamination resistance and high vibration resistance. However, one draw-back for the VR resolver is its size. In order to achieve the high resolution, it has to have enough windings which dictates its overall size. For automotive application, this resolver is fairly big and requires a lot of space for installation.

SUMMARY

A method of assembling a motor includes mounting a resolver sensor onto a housing, providing a bearing, securing a trigger wheel and a rotor to a first race of the bearing, securing a rotor, and securing a second race of the bearing to the housing. The bearing may be a four-point contact ball bearing. The resolver sensor may be mounted to the housing using bolts and spacers. The trigger wheel and rotor are each secured to the first race at circumferentially fixed, predetermined positions relative to the first race. The second race is secured to the housing at a fixed, predetermined axial and radial position relative to the resolver sensor. The first race may be an outer race and the second race may be an inner race. Conversely, the first race may be an inner race and the second race may be an outer race. The trigger wheel may be secured to the first race by sliding the trigger wheel onto the first bearing such that an anti-rotation tab of the trigger wheel aligns with an anti-rotation notch of the first race and then installing an axial locking device. The rotor may be secured to the first race by installing an anti-rotation key between the rotor and the first race. The trigger wheel and resolver sensor may form a variable reluctance angular position sensor.

A motor assembly includes a ball bearing, a trigger wheel, and a rotor. The ball bearing includes a first race, a second race, a cage, and a plurality of balls. The balls are supported by the cage between the first race and the second race. The bearing may be a four-point contact ball bearing. The trigger wheel is secured to the first race at a first fixed relative rotational position. The rotor is secured to the first race at a second fixed relative rotational position. The motor assembly may also include a housing and a resolver sensor. The housing may be secured to the second race at a fixed axial and radial position. The resolver sensor may be mounted to the housing at a fixed axial and radial position relative to the trigger wheel, using bolts for example. The trigger wheel and resolver sensor may form a variable reluctance angular position sensor. The first race may be an outer race and the second race may be an inner race. Conversely, the first race may be an inner race and the second race may be an outer race. The trigger wheel may be secured rotationally to the first race by an anti-rotation tab inserted into an anti-rotation notch and may be secured axially by a snap ring. The rotor may be secured to the first race by an anti-rotation key.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
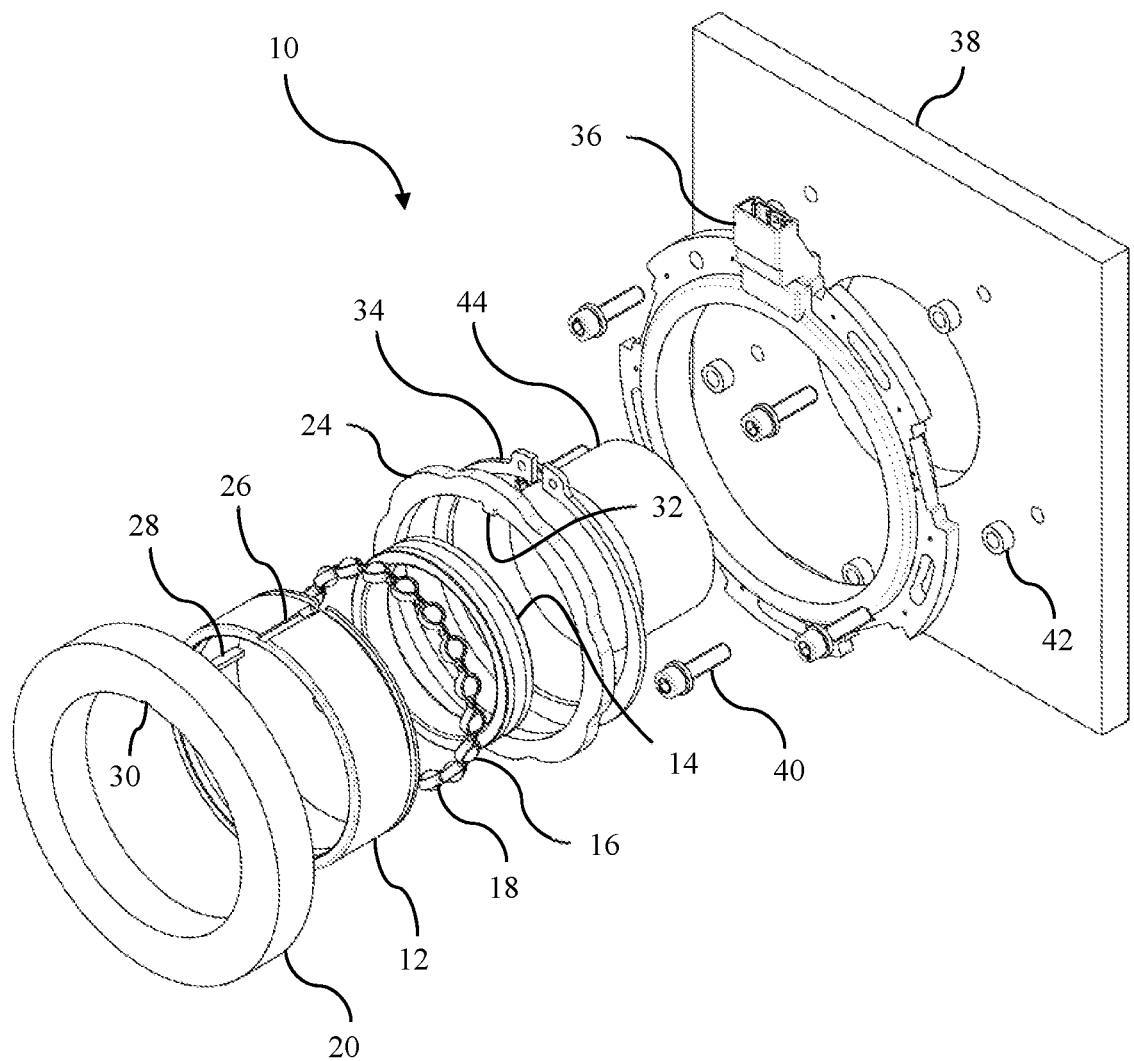
FIG. 1 is an exploded view of a first rotor and resolver assembly.
Figure 2:
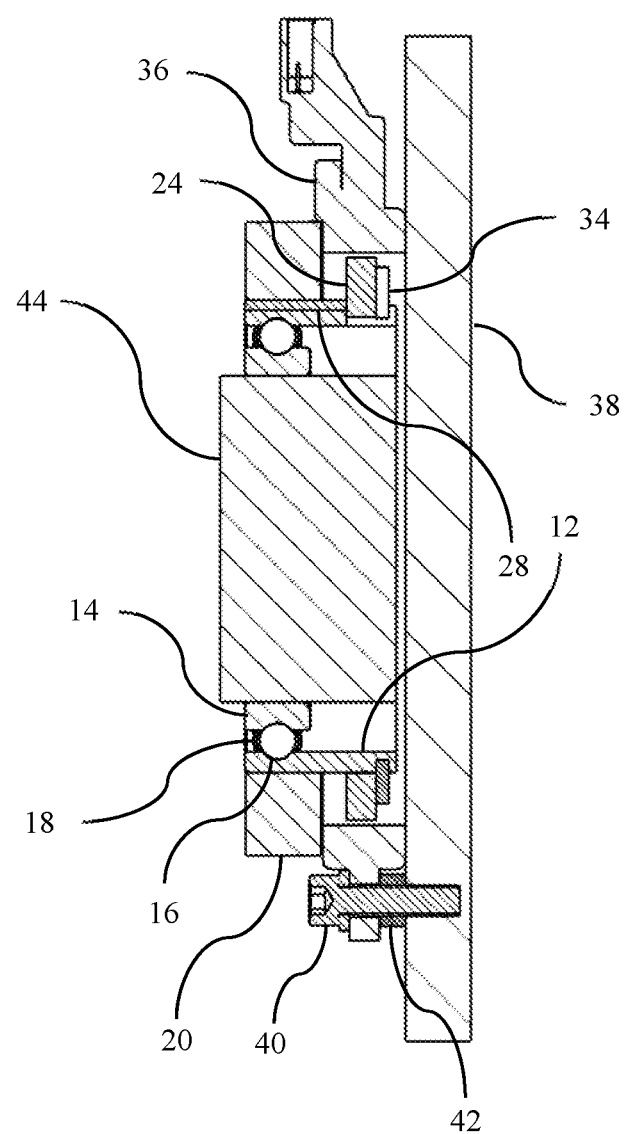
FIG. 2 is a cross sectional view of the rotor and resolver assembly of FIG. 1.

FIGS. 1 and 2 illustrate a first motor assembly 10. The first motor assembly utilizes a four-point contact ball bearing including an outer ring 12, an inner ring 14, and a plurality of balls 16. The balls are retained by a cage 18 that positions the balls circumferentially relative to one another. Each ball 16 contacts the inner ring 14 at two axially separated points and also contacts the outer ring 12 at two axially separated points. The outer and inner rings form first and second races, respectively, of a four-point contact ball bearing. As a result, the bearing maintains concentricity between the inner ring and the outer ring while resisting axial forces, radial forces, and moments about radial axes.

The bearing permits relative rotation between outer ring 12 and inner ring 14 with very low resistance.

Rotor 20 and trigger wheel 24 are both fixed to outer ring 12. An anti-rotation notch 26 is formed on a radially outer surface of outer ring 12. A locking key 28 slides into anti-rotation notch 26 of the outer ring 12 and also into an anti-rotation notch 30 on a radially inner surface of rotor 20, thereby preventing relative rotation and establishing a pre-determined relative rotational position between rotor 20 and outer ring 12. An anti-rotation tab 32 formed on a radially inner surface of trigger wheel 24 slides into anti-rotation notch 26 of outer ring 12, thereby preventing relative rotation and establishing a pre-determined relative rotational position between trigger wheel 24 and outer ring 12. Collectively, these features establish a predetermined relative rotational relationship between rotor 20 and trigger wheel 24. An axial locking device, such as snap ring 34, holds trigger wheel 24 in a predetermined axial position relative to outer ring 12.

Resolver sensor 36 is fixed to housing 38. For example, sensor 36 may be fixed to housing 38 by a plurality of bolts 40. Hollow spacers 42 may be held between the sensor 36 and the housing 38 to axially position the sensor at a desired distance from the housing.

Inner ring 14 is supported at a predetermined axial position relative to housing 38. This may be accomplished, for example, by press fitting the inner ring onto a shaft 44 which is supported at a predetermined axial position relative to housing 38. Shaft 44 may be rigidly fixed to housing 38 or may be supported for rotation relative to housing 38. Collectively, these parts support the trigger wheel 24 at a predetermined and fixed axial and radial position relative to the resolver sensor 36, enabling the resolver sensor to accurately determine the rotational position of rotor 20.

Figure 3:
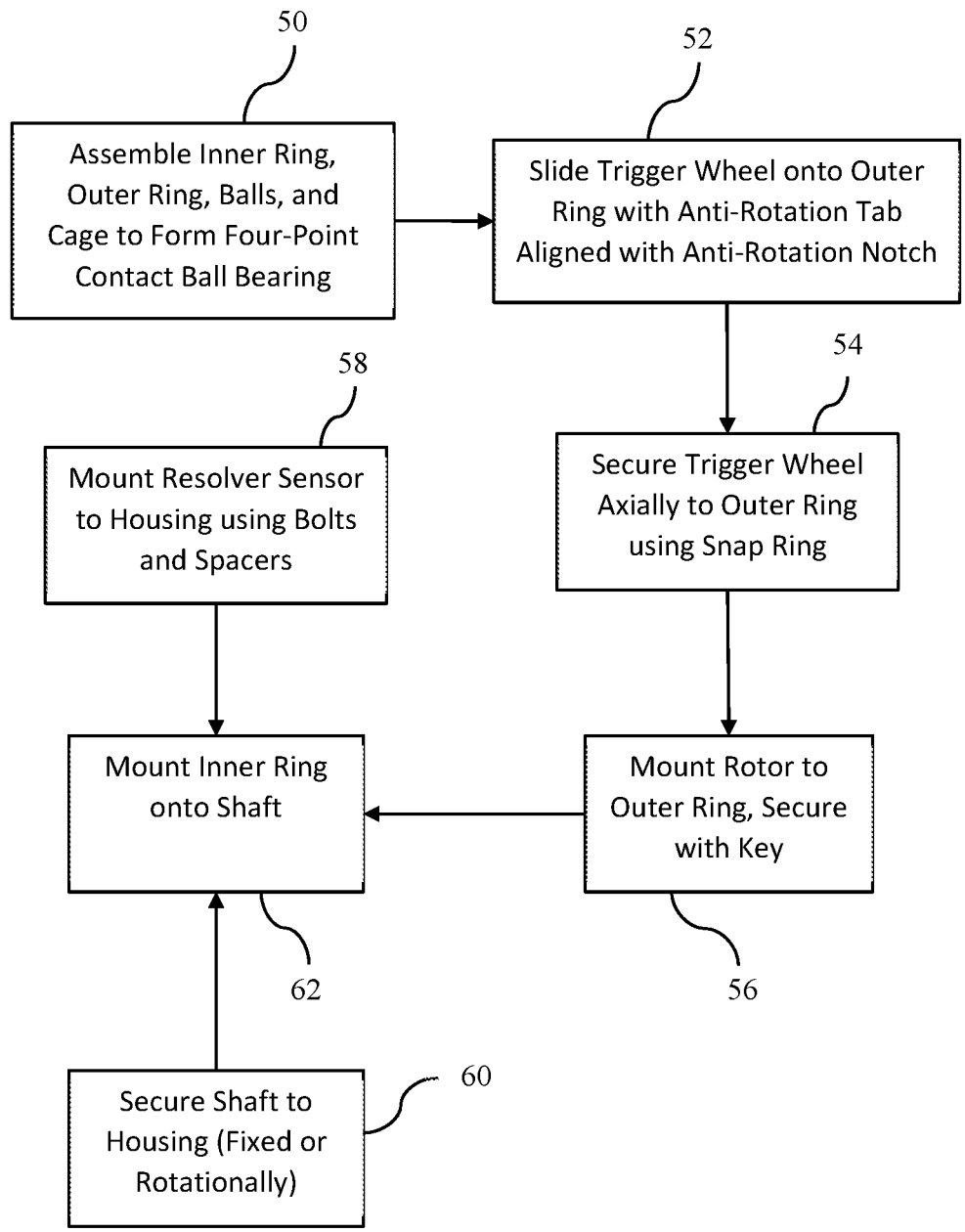
FIG. 3 is a flow chart for a method of assembling the rotor and resolver assembly of FIG. 1.

FIG. 3 is a flowchart for a process of assembling the motor and resolver of FIGS. 1 and 2. At 50, the bearing is assembled from the inner ring 14, outer ring 12, cage 18, and balls 16. This may be done, for example, using the Conrad method. At 52, the trigger wheel 24 is slid onto the outer ring 12, with anti-rotation tab 32 aligned with anti-rotation notch 26. Trigger wheel 24 is secured axially at 54 using snap ring 34. At 56, rotor 20 is mounted to outer ring 12 and secured with key 28. At 58, resolver sensor 36 is mounted to housing 38 using bolts 40 and spacers 42. At 60, shaft 44 is secured to housing 38. Finally, at 62, inner ring 14 is mounted to shaft 44.

This system allows a simpler assembly sequence. Instead of needing to secure two components to the rotor, the trigger wheel and the outer ring, only one component, the bearing ring, must be secured to the rotor. This permits the rotor to be shorter, thereby allowing more space for the trigger wheel and resolver sensor. The four-point contact ball bearing simplifies the mounting of the rotor because it resists a moment about a radial axis in addition to resisting axial and radial forces.

Figure 4:
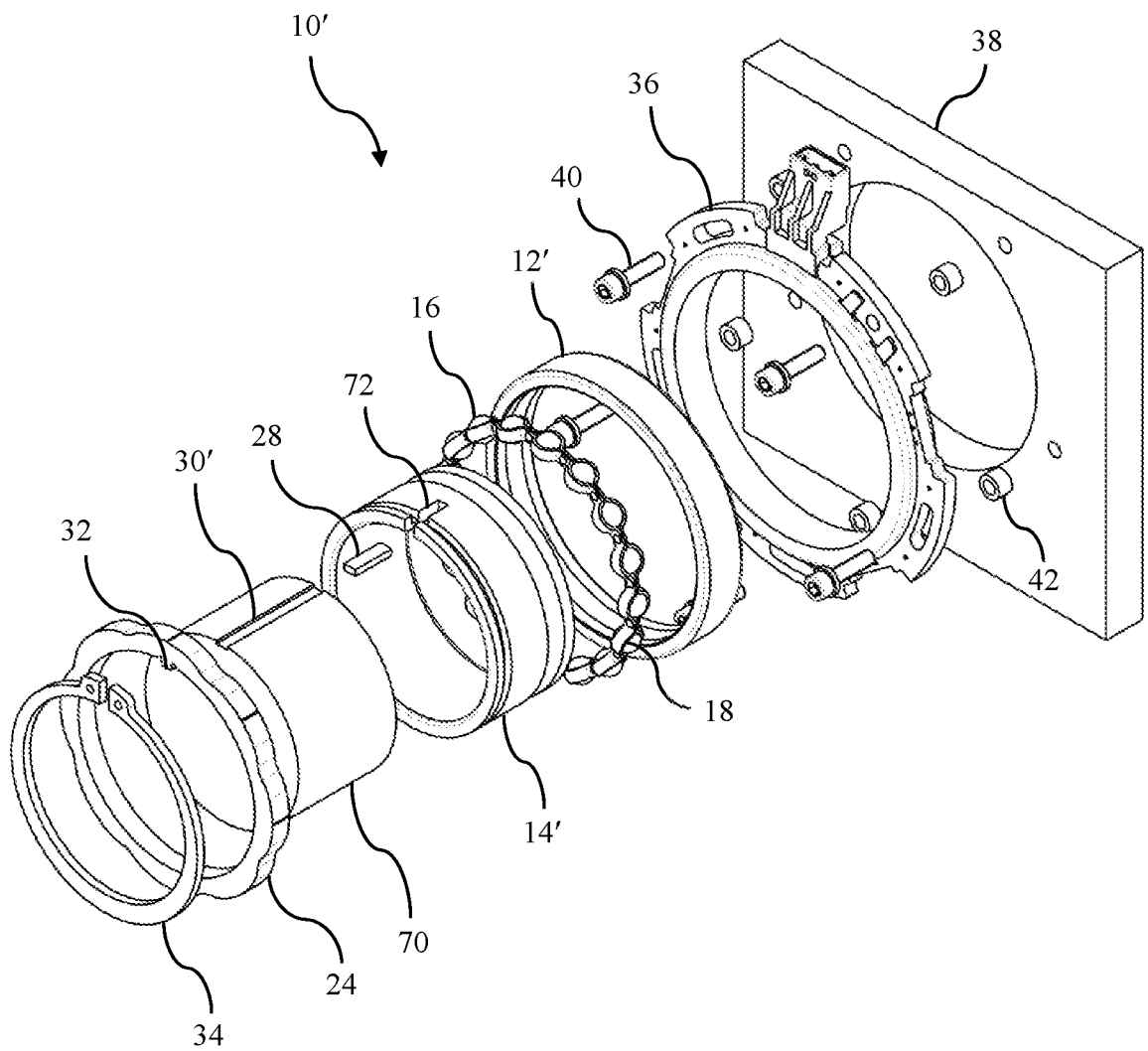
FIG. 4 is an exploded view of a second rotor and resolver assembly.
Figure 5:
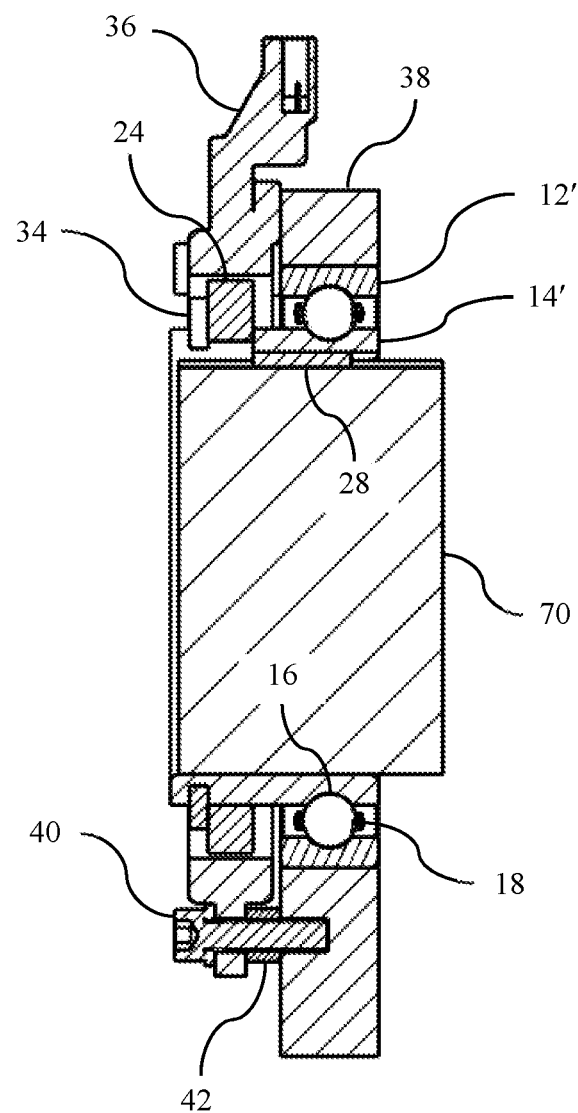
FIG. 5 is a cross sectional view of the rotor and resolver assembly of FIG. 4.

A second embodiment, illustrated in FIGS. 4-5 provides similar advantages. Components that are unchanged from the first embodiment are denoted with the same reference numbers. Components that are similar but modified from the first embodiment are denoted with a prime ('). The second motor assembly 10' utilizes a four-point contact ball bearing including an outer ring 12', an extended inner ring 14', and a plurality of balls 16. The balls are retained by a cage 18 that positions the balls circumferentially relative to one another. Each ball 16 contacts the inner ring 14' at two axially separated points and also contacts the outer ring 12' at two axially separated points.

Rotor shaft 70 and trigger wheel 24 are both fixed to extended inner ring 14'. An anti-rotation slot 72 is formed in the extension of inner ring 14'. A locking key 28 slides into anti-rotation slot 72 of the inner ring 14' and also into an anti-rotation notch 30' on a radially outer surface of rotor shaft 70, thereby preventing relative rotation and establishing a pre-determined relative rotational position between rotor shaft 70 and inner ring 14'. An anti-rotation tab 32 formed on a radially inner surface of trigger wheel 24 slides into anti-rotation slot 72 of inner ring 14', thereby preventing relative rotation and establishing a pre-determined relative rotational position between trigger wheel 24 and inner ring 14'. Collectively, these features establish a predetermined relative rotational relationship between rotor shaft 70 and trigger wheel 24. An axial locking device, such as snap ring 34, holds trigger wheel 24 in a predetermined axial position relative to inner ring 14'.

Resolver sensor 36 is fixed to housing 38 using bolts 40 and spacers 42, as in the first embodiment. Outer ring 12' is supported at a predetermined axial position relative to housing 38. This may be accomplished, for example, by press fitting the outer ring to housing 38. Collectively, these parts support the trigger wheel 24 at a predetermined and fixed axial and radial position relative to the resolver sensor 36, enabling the resolver sensor to accurately determine the rotational position of rotor shaft 70.

Figure 6:
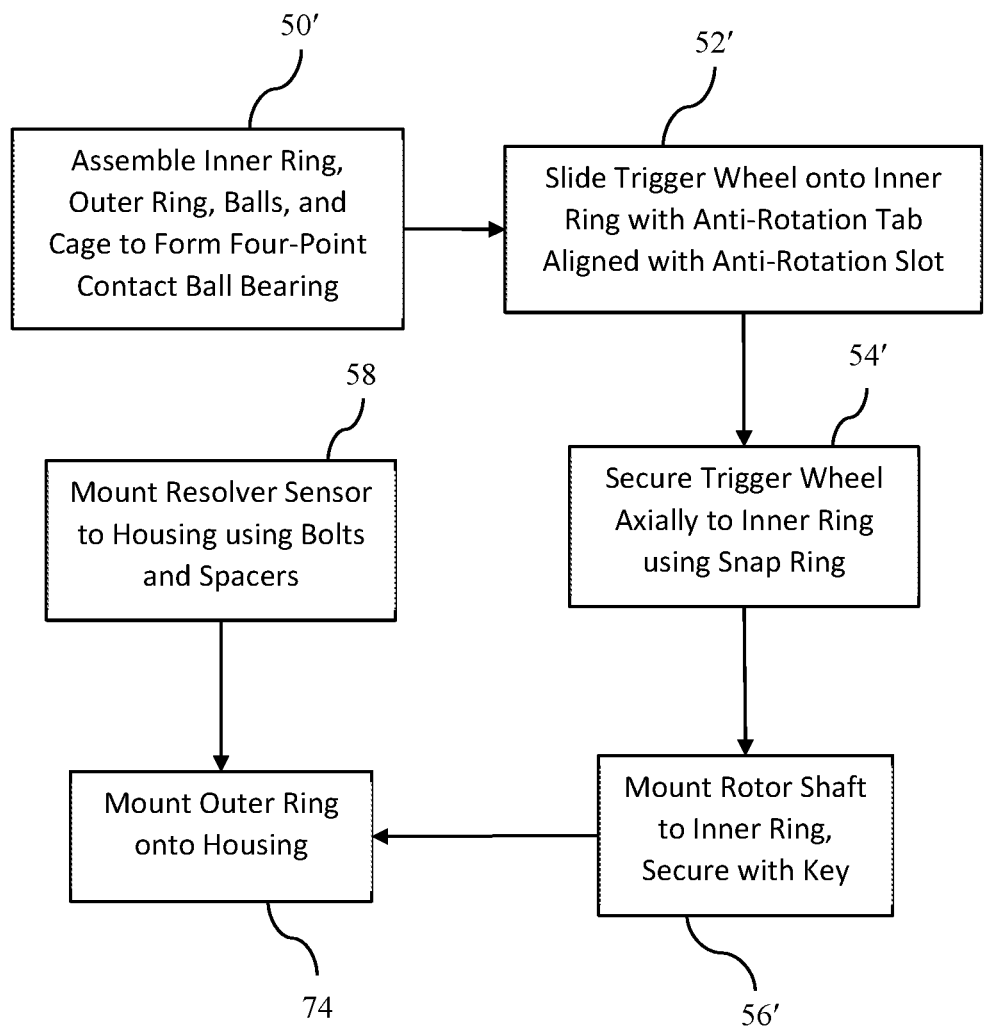
FIG. 6 is a flow chart for a method of assembling the rotor and resolver assembly of FIG. 4.

FIG. 6 is a flowchart for a process of assembling the motor and resolver of FIGS. 4 and 5. At 50', the bearing is assembled from the inner ring 14', outer ring 12', cage 18, and balls 16. This may be done, for example, using the Conrad method. At 52', the trigger wheel 24 is slid onto the inner ring 14', with anti-rotation tab 32 aligned with anti-rotation slot 72. Trigger wheel 24 is secured axially at 54' using snap ring 34. At 56', rotor shaft 70 is mounted to inner ring 14' and secured with key 26. At 58, resolver sensor 36 is mounted to housing 38 using bolts 40 and spacers 42. Finally, at 74, outer ring 12' is mounted to housing 38.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A method of assembling a motor comprising:
    mounting a resolver sensor onto a housing;
    providing a bearing including a first race, a second race, and a plurality of rolling elements, the rolling elements being supported between the first race and the second race;
    securing a trigger wheel to the first race at a circumferentially fixed, predetermined relative position;

after securing the trigger wheel to the first race, securing a rotor of the motor to the first race at a circumferentially fixed, predetermined relative position; and securing the second race to the housing at a fixed, predetermined axial and radial position relative to the resolver sensor.

2. The method of claim 1 wherein the resolver sensor is mounted to the housing using bolts.

3. The method of claim 1 wherein the first race is an outer race and the second race is an inner race.

4. The method of claim 3 wherein securing the second race to the housing comprises securing the second race to a shaft that is fixed to the housing.

5. The method of claim 1 wherein the first race is an inner race and the second race is an outer race.

6. The method of claim 1 wherein securing the trigger wheel to the first race comprises:
sliding the trigger wheel onto the first race such that an anti-rotation tab of the trigger wheel aligns with an anti-rotation notch of the first race; and
installing an axial locking device.

7. The method of claim 1 wherein securing the rotor to the first race comprises installing an anti-rotation key between the rotor and the first race.

8. The method of claim 1 wherein the bearing is a four-point contact ball bearing.

9. The method of claim 1 wherein the trigger wheel and resolver sensor form a variable reluctance angular position sensor.

10. A motor assembly comprising:
a ball bearing including a first race defining an anti-rotation notch, a second race, a cage, and a plurality of balls, the balls being supported by the cage between the first race and the second race;
a trigger wheel having an anti-rotation tab and secured to the first race at a first fixed relative rotational position by engagement of the anti-rotation tab in the anti-rotation notch; and
a rotor secured to the first race at a second fixed relative rotational position.

11. The motor assembly of claim 10 further comprising:
a housing secured to the second race at a fixed axial and radial position; and
a resolver sensor mounted to the housing at a fixed axial and radial position relative to the trigger wheel.

12. The motor assembly of claim 11 wherein the resolver sensor is mounted to the housing using bolts.

13. The motor assembly of claim 11 wherein the trigger wheel and resolver sensor form a variable reluctance angular position sensor.

14. The motor assembly of claim 10 wherein the first race is an outer race and the second race is an inner race.

15. The motor assembly of claim 14 further comprising a shaft fixed to a housing and secured to the second race.

16. The motor assembly of claim 10 wherein the first race is an inner race and the second race is an outer race.

17. The motor assembly of claim 10 wherein the trigger wheel is secured axially by a snap ring.

18. The motor assembly of claim 10 wherein the rotor is secured to the first race by an anti-rotation key.

19. The motor assembly of claim 10 wherein the bearing is a four-point contact ball bearing.

20. A motor assembly comprising:
a ball bearing including a first race defining an anti-rotation notch, a second race, a cage, and a plurality of balls, the balls being supported by the cage between the first race and the second race;
a rotor secured to the first race at a first fixed relative rotational position by an anti-rotation key;
a housing secured to the second race at a fixed axial and radial position; and
a variable reluctance angular position sensor comprising:
a trigger wheel having an anti-rotation tab and secured rotationally to the first race at a second fixed relative rotational position by insertion of the anti-rotation tab into the anti-rotation notch and secured axially by a snap ring; and
a resolver sensor mounted to the housing at a fixed axial and radial position relative to the trigger wheel.

* * * * *